(12) United States Patent
Knoll

(10) Patent No.: US 9,885,268 B2
(45) Date of Patent: Feb. 6, 2018

(54) REFLECTIVE INSULATION SYSTEM

(71) Applicant: ISOLITE GmbH, Ludwigshafen (DE)

(72) Inventor: Michael Knoll, Ludwigshafen (DE)

(73) Assignee: Isolite GMBH, Ludwigshafen (DE)

( * ) Notice: Subject to any disclaimer, the term of this patent is extended or adjusted under 35 U.S.C. 154(b) by 0 days.

(21) Appl. No.: 15/259,532

(22) Filed: Sep. 8, 2016

(65) Prior Publication Data

US 2017/0074136 A1 Mar. 16, 2017

(30) Foreign Application Priority Data

Sep. 10, 2015 (EP) .................................... 15184579

(51) Int. Cl.
*F01N 13/14* (2010.01)
*F01N 1/24* (2006.01)
*B32B 15/08* (2006.01)
*B32B 15/18* (2006.01)

(52) U.S. Cl.
CPC ................ *F01N 1/24* (2013.01); *B32B 15/08* (2013.01); *B32B 15/18* (2013.01); *F01N 13/14* (2013.01); *F01N 13/143* (2013.01); *F01N 13/148* (2013.01); *B32B 2255/10* (2013.01); *B32B 2307/102* (2013.01); *B32B 2307/304* (2013.01); *B32B 2307/416* (2013.01); *F01N 2260/20* (2013.01); *F01N 2310/02* (2013.01)

(58) Field of Classification Search
CPC ....... F01N 13/14; F01N 13/143; F01N 13/148
USPC .................................................. 181/256, 282
See application file for complete search history.

(56) References Cited

U.S. PATENT DOCUMENTS

| 6,555,070 | B1* | 4/2003 | Kruger | F01N 3/2853 422/177 |
| 8,539,986 | B2* | 9/2013 | Kroll | F01N 13/102 138/137 |
| 8,739,837 | B2* | 6/2014 | Kroll | F01N 13/16 138/149 |
| 2009/0197044 | A1 | 8/2009 | Pelzer et al. | 428/138 |
| 2010/0035078 | A1* | 2/2010 | Staudt | B32B 3/28 428/596 |
| 2012/0096842 | A1 | 4/2012 | Kroll et al. | 60/232 |

(Continued)

FOREIGN PATENT DOCUMENTS

DE 102010060071 5/2012

OTHER PUBLICATIONS

Search Report or action dated Feb. 11, 2016 in corresponding European Application No. 15184579.9.

(Continued)

*Primary Examiner* — Jeremy Luks
(74) *Attorney, Agent, or Firm* — Fattibene and Fattibene LLC; Paul A. Fattibene

(57) ABSTRACT

Insulation system for thermoacoustic insulation of a component to be insulated, such as an exhaust gas component, comprising a fiber molded part having a surface facing away from the component to be insulated, where the surface facing away is at least in part jacketed with a cladding, and having an insulation surface facing the component to be insulated, where the fiber molded part is applied to the component to be insulated such that at least one cavity is formed between a portion of the insulation surface of the fiber molded part and the component to be insulated.

21 Claims, 6 Drawing Sheets

(56) References Cited

U.S. PATENT DOCUMENTS

2012/0103457 A1    5/2012  Kroll et al. .................. 138/149

OTHER PUBLICATIONS

Office Action dated Jul. 25, 2017 in corresponding Japanese application 2016-176427, with English translation, 14 pages.
Office Action dated Aug. 17, 2017 in corresponding Korean application 10-2016-0116741, with English translation, 16 pages.

* cited by examiner

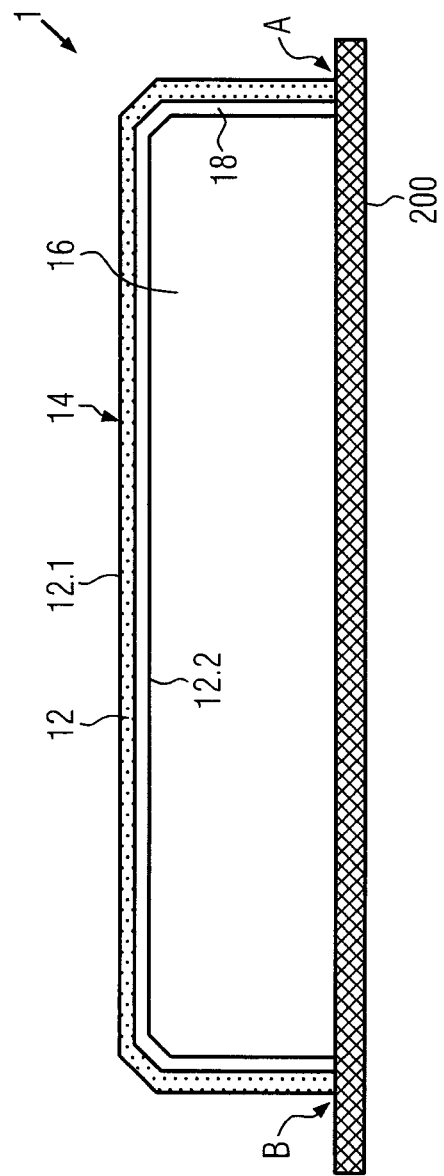

REFLECTIVE INSULATION SYSTEM

FIELD OF THE INVENTION

The invention relates to an insulation system for thermoacoustic insulation of a component to be insulated, such as an exhaust gas component, and a respective method for insulating such a component.

BACKGROUND OF THE INVENTION

Before discussing thermal insulation in more detail, it is useful to define the specific heat capacity of a body.

The heat capacity C of a substance is the quotient of the heat Q which is supplied to the body and the temperature increase $\Delta T$ that this causes:

$$C = \frac{Q}{\Delta T}. \tag{1}$$

The specific heat capacity c, also referred to as specific heat, arises from scaling the heat capacity C to the mass of the substance. In other words, the specific heat capacity of a substance is the energy that is needed to heat 1 kg of this substance by 1 K:

$$c = \frac{C}{m} = \frac{Q}{m \cdot \Delta T}. \tag{2}$$

The specific heat capacity is only slightly dependent on the temperature. Since the specific heat capacity c is typically given as a material constant, the formula (2) is often written as $$Q = c \cdot m \cdot \Delta T. \tag{3}$$

In thermal insulation, for example, with exhaust gas systems of vehicles, three mechanisms are basically to be considered, heat conduction, heat radiation and convection.

Heat conduction, also referred to as heat diffusion, is understood to be a heat flow as a result of a temperature difference. The direction of flow is according to the second law of thermodynamics always directed from the higher to the lower temperature. Ideally no heat energy is lost there.

With heat radiation, also electromagnetic radiation is emitted from a solid body, fluids or plasma. The radiated power P emitted is there proportional to the fourth power of the radiating body, i.e. $P \propto T^4$ (Stefan-Boltzmann law). In a vacuum, heat radiation is the only way to transfer thermal energy.

Convection or heat transfer is another mechanism for heat transport. Convection is caused by a flow which transports particles. For example, a fluid flowing can absorb heat from a surface or release it thereto. One cause of the transporting flow can be temperature differences. In forced convection, the particle transport is caused by external influence, for example, a fan or a pump. In natural convection, the particle transport is caused by a temperature gradient present within the medium.

In systems to be insulated, motors are often driven at high speed whereby a high noise level can occur. Therefore, the aspect of sound insulation is added to thermal insulation.

Three known types of insulation known from practice are described below by way of example.

1. Air Gap Insulation

A first example is air gap insulation without convection. In air gap insulation without convection, a self-contained insulating system is given in which substantially still air is used as insulating material. An advantage of this type of isolation is the low specific heat capacity of air. The system can therefore absorb only a small amount of heat. Due to this circumstance, the heat energy in heat-saturated insulating material, i.e. heat-saturated air, largely remains available to the system to be insulated. Furthermore, the heat loss by conduction is kept very low due to the low thermal conductivity of air. A drawback of this method is heat radiation which can act upon the surrounding components. Furthermore, only a very small temperature difference over the insulation zone is possible. This means that the surface temperature of the insulation system, i.e. the air, is only slightly lower than the application temperature, i.e. the temperature of the system to be insulated, such as the exhaust gas component. It can in summary be said about air gap insulation without convection that it offers very good energy conservation in the system to be insulated but for surrounding components does not ensure adequate protection due to the high surface temperatures. The environment is also barely protected against acoustic emissions.

2. Air Gap Insulation with Convection and a Heat Shield

A further example is air gap insulation with convection and a heat shield. Air gap insulation with convection and a heat shield, conventionally only referred to as a heat shield, is an insulation system which is not self-contained. It offers extended influence by the environment. In this type of insulation, a kind of shield is in a spaced manner attached in front of the component to be insulated and is to absorb the heat radiation in front of surrounding components in order to protect them. The drawbacks and advantages described above in 1. are here given in the reverse position. Due to the constant layer change of air, the heat emitted by the system to be insulated is constantly again absorbed, this is also in accordance with equation (3). This leads to increased energy losses in this system to be insulated because the amount of heat of the insulation to be absorbed, i.e. of the air gap, can virtually never approach zero.

Unlike with the air gap insulation without convection, a far lower temperature than the initial temperature is measured due to the circumstance of the continuously changing layers of air and the associated heat dissipation to the surface of the insulation system. Moreover, exposure of surrounding components to thermal radiation is greatly reduced due to the function of the shield. One drawback of this system is low acoustic absorption. It can in summary be said about air gap insulation with convection that surrounding components are very well protected against thermal influences, but that this is at the expense of energy conservation in the system to be insulated and of avoidance of acoustic emissions into the environment.

3. Isolation with Filling Material

A third example of insulation systems are those in which the insulating material is filling material between the system to be insulated and a metal outer shell. In high temperature applications, this is usually glass fibers, for example, silica fibers or ceramic fibers which are applied directly onto the systems to be insulated. This is currently one of the methods most commonly used in the automotive sector. This insulation method provides an in-between solution to the first two. The advantages are low surface temperatures at a small installation space, as well as good acoustic absorption by the fiber material. In terms of energy conservation in the system to be insulated, this is an in-between solution. No perceivable convection is given which is why it is in terms of energy conservation better suited than the heat shield insulation. However, this system provides a much greater amount of heat to be absorbed than the air gap insulation without convection, which in the present case means reduced energy conservation. A further drawback in terms of energy conservation is the lack of reflection of radiation caused by the direct application which allows only for heat conduction. It can in summary be said that this insulation system is the middle ground between the first two systems mentioned and therefore represents one of the most common methods used.

SUMMARY OF THE INVENTION

Given these drawbacks of prior art, the object of the present invention is to provide an alternative insulation system which insulates the system to be insulated while protecting the environment from heat exposure and acoustic exposure.

This object is satisfied by the insulation system according to apparatus and method embodiments of the present invention.

The invention provides: an insulation system for thermoacoustic insulation of a component to be insulated, for example, an exhaust gas component, comprising a fiber molded part having a surface facing away from the component to be insulated, where the surface facing away is at least in part jacketed with a cladding, and having an insulation surface facing the component to be insulated, where the fiber molded part is applied to the component to be insulated such that at least one cavity is formed between a portion of the insulation surface of the fiber molded part and the component to be insulated.

A cavity is there to be understood as a closed system, a chamber. This system, i.e. the cavity, is defined and thereby enclosed by the insulation surface of the fiber molded part on the one hand and the surface of the component to be insulated or the regions to be insulated of this component. As a closed system, the cavity provides the advantage that it encloses air. The cavity therefore acts as an air chamber. Based on equation (3), this results in a low amount of heat to be absorbed by the insulation system because the air enclosed has only a small mass. Due to the fact that the cavity is enclosed, virtually no perceivable convection occurs. After heating the insulation system, i.e. the cavity, more specifically the air in the cavity, with a small amount of heat, almost the entire amount of heat energy remains in the system to be insulated. Additional heat absorption can occur only at the contact surfaces. However, since the contact surfaces are small and limited, only slightly greater heat absorption occurs via the contact surface. In terms of thermal conductivity, the advantage is presently given that air, in particular still air, is a medium having very low thermal conductivity. Unlike with the air gap insulation without convection, the fiber mold part, which can for example comprise an insulation fiber, is located above the cavity. This can in particular provide for low surface temperatures. Therefore, almost the entire heat energy remains in the system to be insulated and surrounding components are optimally protected because the surface temperatures remain relatively low.

In the insulation system the insulation surface of the fiber molded part can be coated with colored pigments which have a TSR, total solar reflectance, value of at least 65%, where the percentage of colored pigments relative to the total mass of the fiber molded part amounts to between 1-5%, preferably between 1.5-3%.

By coating the fiber molded part on the warm side surface with a pigment having a high TSR value, total solar reflection value, especially in the NIR range, near-infrared range, the return reflection of thermal radiation can be additionally increased. This can be regarded as being a greenhouse effect artificially induced in the cavities. The emitted heat radiation of the system to be insulated, such as of an exhaust gas component, is reflected by the treated surface of the fiber molded part and largely returned to the system to be insulated. The absorbed portion of the radiation again contributes to the thermal saturation of the insulation system. For example, the colored pigments can comprise a polishing rutile based on chromium/antimony/titanium.

An inner liner can be inserted between the insulation surface of the fiber molded part and the component to be insulated, where this is preferably a metal inner liner.

If direct application, i.e. direct contact between the fiber molded part and the component to be insulated is not desired or even difficult, a metal inner liner can be used. It has the advantage that removal and remounting of the fiber molded part can be provided as simple as possible. The fiber molded part, i.e. in particular the fiber material can additionally be protected.

In the insulation system, the cladding can comprise metal cladding or duroplastic-thermoplastic plastic or elastomeric plastic.

In addition to the thermal properties, these plastics are also distinguished by good acoustic properties in terms of sound insulation. In the embodiment with suitable metal cladding, it can typically be provided such that the outer shell can be closed or opened. This provides the possibility of having variable opening or closure of the outer shell, i.e. the cladding. The system thereby provides the option to quickly reach the operating temperature according to the exhaust gas system when the shell is closed and to effect cooling of the component by convection with an open variant, i.e. to selectively switch convection on or off.

In the insulation system, a predefined proportion of the insulation surface of the fiber molded part can contact the component to be insulated, where the predefined proportion amounts to at least 10% and at most 90%, in particular at least 25% to at most 55%.

Though the fiber molded part, i.e. the insulating material, has a somewhat higher but still low thermal conductivity as compared to the air in the cavity, the contact surface of the fiber molded part to the system to be insulated, however, can be kept small, namely, for example, at only 10%. Below 10%, problems with instabilities arise. A typical value within the meaning of an upper limit can be approximately 90% of the insulation surface, above 90% the advantages over a fully contacted insulation surface rapidly disappear. However, other values are also possible, in particular a value between a minimum of 25% up to a maximum of 55%. This results in a sort of symbiosis from reduced thermal conductivity of the system. From the insulation fiber of the fiber molded part located above the cavity, the option therefore arises to achieve low surface temperatures. Therefore, almost the entire heat energy practically remains in the system to be insulated and surrounding components are well protected due to the low surface temperatures.

In the insulation system, the insulation surface on the side facing the component to be insulated can comprise one or more predefined indentations.

The indentations can there be semi-spherical and/or semi-cylindrical indentations so that the cavity can be formed to be semi-spherical and/or semi-cylindrical in shape.

The indentations can be understood to be air chambers, i.e. air-filled cavities, where the advantages mentioned above apply for each of the cavities. In addition, symmetrical easy-to-produce shapes can be formed. Semi-cylindrical indentations have the advantage that they can in terms of production engineering/tool engineering be realized in a particularly simple manner and thereby exhibit the advantageous properties of the insulation system. It is understood that other body or partial body shapes can be selected so that one or more cavities can be formed.

The invention further provides an exhaust gas component with an insulation at least in part arranged on the component, where the insulation is formed as an insulation system as described above.

Similarly, the invention provides a silencer comprising at least one exhaust gas component as described above.

The invention further provides a method for thermoacoustic insulation of an exhaust gas component, said method comprising the steps of: providing a fiber molded part having a surface facing away from the component to be insulated, where the surface facing away is at least in part jacketed with a cladding, and having an insulation surface facing the component to be insulated, applying the fiber molded part to the exhaust gas component such that at least one cavity is formed between a portion of the insulation surface of the fiber molded part and the component to be insulated.

The advantages of the method and its steps have already been described above in terms of the insulation system.

The insulation surface of the fiber molded part can in the method be coated with colored pigments which have a TSR, total solar reflectance, value of at least 65%, where the percentage of colored pigments relative to the total mass of the fiber molded part amounts to between 1-5%, preferably between 1.5-3%.

For example, the colored pigments can comprise a polishing rutile based on chromium/antimony/titanium.

An inner liner can be inserted between the insulation surface of the fiber molded part and the component to be insulated, where this is preferably a metal inner liner.

The fiber molded part can in the method further comprise a surface facing away from the component to be insulated, where the surface facing away is at least in part jacketed with a cladding, where the cladding can be metal cladding or comprise duroplastic-thermoplastic plastic or elastomeric plastic.

In the method, a predefined proportion of the insulation surface of the fiber molded part can contact the component to be insulated, where the predefined proportion amounts to at least 10% and at most 90%, in particular at least 25% to at most 55%.

In the method, the insulation surface on the side facing the component to be insulated can comprise one or more predefined indentations, where the indentations are preferably formed semi-spherical or semi-cylindrical in shape.

It is there again understood that other body or partial body shapes can be selected so that one or more cavities can be formed.

An example of an application of the insulation system described and the corresponding method is the automotive sector. It is there, for example, important to meet the stringent European standards according to which it is required that exhaust energy and temperature be maintained to an ever higher level in order to optimally operate the downstream units in the exhaust system, such as DPF, oxicat, SCR System etc. and to reduce emissions. The general issue is to keep as low as possible the energy losses of the system to be insulated due to energy release in the form of thermal energy, i.e. heat conduction, heat radiation, convection, and also in the form of acoustic energy, i.e. noise.

Embodiments of the invention are described hereafter with reference to the figures. The embodiments described are to be considered in all aspects as being only illustrative and not restrictive and various combinations of the features specified are comprised by the invention.

BRIEF DESCRIPTION OF THE DRAWINGS

FIGS. 2A-B are schematic views of an insulation systems with an inner liner.

DETAILED DESCRIPTION OF THE INVENTION

Figure 1:
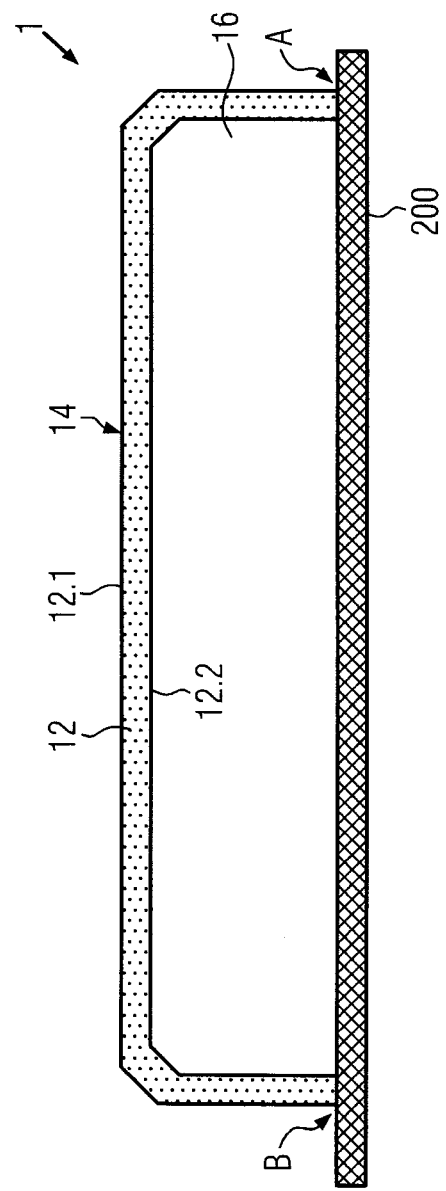
FIG. 1 is a schematic view of an insulation system

FIG. 1 shows a schematic view of an insulation system 1 for thermoacoustic insulation of a component 200 to be insulated. Component 200 to be insulated can be, for example, an exhaust gas component. Insulation system 1 in FIG. 1 comprises a fiber molded part 12 which comprises insulating material, for example, fibers or non-woven fabric. Fiber molded part 12 has a side or surface facing away from component 200 to be insulated and designated with reference numeral 12.1. Surface 12.1 is in FIG. 1 jacketed with cladding 14. In the schematic illustration in FIG. 1, cladding 14 practically rests on surface 12.1.

Fiber molded part 12 further has a side or surface 12.2 facing the component to be insulated. Surface 12.2 is an insulation surface. FIG. 1 shows a highly simplified sectional drawing. A component 200 to be insulated is there insulated by an insulation system 1 with a fiber molded part 12. Fiber molded part 12 is applied to component 200 to be insulated such that it contacts component 200 to be insulated with only a portion of insulation surface 12.2. Contacting insulation surface 12.2 is there performed such that a cavity 16 is formed. Cavity 16 can there also be understood to be a chamber. Cavity 16 is entirely enclosed or defined by insulation surface 12.2 and component 200 to be insulated, i.e. is formed therebetween. Cavity 16 is typically filled with air and can also be regarded as being an air chamber. It is understood that several cavities of a similar nature can be formed and that FIG. 1 illustrates only one of the simplest options and shows only one cavity.

Cavity 16 or several separate cavities each form a closed storage system. Cavity 16 can therefore enclose air. Air in turn has a low heat capacity and therefore according to equation (3) can absorb only a small amount of heat of the system to be insulated. Virtually no convection occurs in cavity 16. This leaves nearly all the heat energy in system 200 to be insulated.

In the example shown in FIG. 1, insulation surface 12.2 is in contact with component 200 only in the region of points A and B. This is therefore a predefined portion of insulation surface 12.2 of the fiber molded part in region A and B where component 200 to be insulated is in contact with insulation surface 12.2. The predefined portion can typically amount to at least 10%. A typical value within the meaning of an upper limit can amount to 90% of the insulation surface. Other values can also be possible. It can below 10% occur that problems with instability arise. Above 90%, the advantages over a fully contacted insulation surface rapidly disappear. However, other values are possible, in particular a value between a minimum of 25% up to a maximum of 55% is possible.

Only where insulation surface 12 is in contact with component 200, i.e. at the contact surfaces in region A and B, can additional heat absorption of fiber molded part 12, i.e. the insulating material take place. However, since the contact surfaces are small and limited, only very little absorption of heat occurs via the contact surface. A further advantage is that entire fiber molded part 12 comprises insulating material. Cavity 16 is therefore in the region of fiber molded part 12 enclosed by insulating material. This insulating material can again ensure that the surface temperature can at side 12.1 opposite to the component to be insulated be significantly reduced, so that the surrounding can be protected by insulation system 1. Almost all the heat energy can remain within the system to be insulated and the surrounding components are well protected.

Figure 2A:
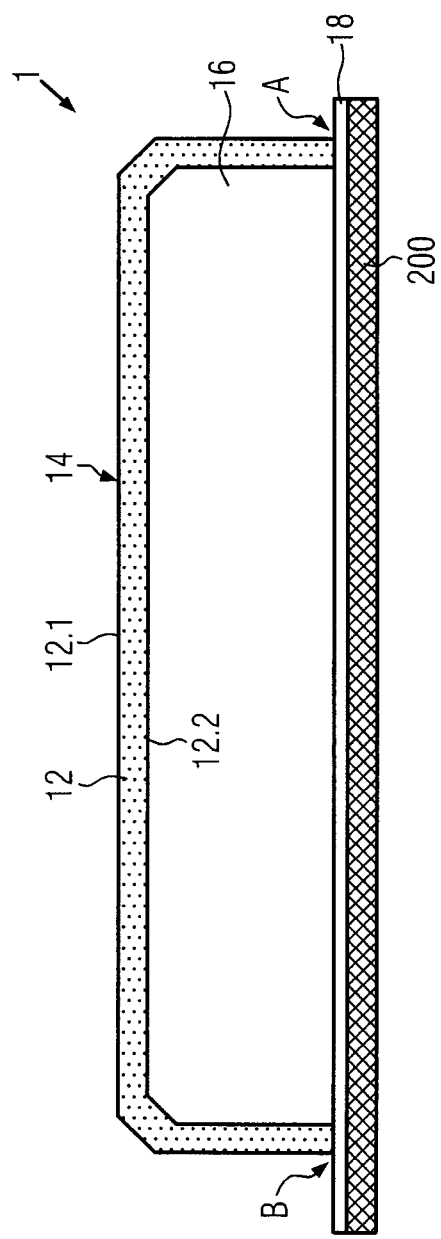

Insulation surface 12.2 of fiber molded part 12 can additionally be coated with colored pigments, for example, a polishing rutile based on chromium/antimony/titanium, which have a TSR, total solar reflectance, value of at least 65%, where the percentage of colored pigments relative to the total mass of the fiber molded part amounts to between 1-5%, preferably between 1.5-3%. Possible energy output by thermal radiation can therefore additionally be counteracted and the energy can be retained even better within the system to be insulated FIG. 2A shows a similar schematic sectional view of an insulation system 1 as shown in FIG. 1. The same elements are given the same reference numerals and shall presently not be explained again. In addition, FIG. 2A shows an inner liner 18 which is provided between component 200 to be insulated and insulation surface 12.2 of the fiber molded part. Inner liner is typically made of metal, such as stainless steel with material number WNr. 1.4541 Inner liner 18 is shown in FIG. 2A such that it rests on component 200 and thereby forms a kind of additional layer on component 200. It is understood, however, that inner liner 18 can also only be provided substantially in region A and B, i.e. where in FIG. 1 insulation surface 12.2 is in contact with component 200. Inner liner 18 can in these contact regions A and B be provided between component 200 and the insulation surface. It is understood that the inner liner does not change the size of the predefined portion of insulation surface 12.2 of the fiber molded part in region A and B explained in FIG. 1 where component 200 to be insulated is in contact with insulation surface 12.2. Inner liner 18 can on the one hand serve to provide additional protection for the insulating material of fiber molded part 12 against mechanical and thermal loads. On the other hand, fiber molded part 12 can easily be mounted or replaced so that greater processing and maintenance flexibility can thereby be provided.

FIG. 2B shows a variant of the embodiment shown in FIG. 2A. The material properties of inner liner 18 can there be the same. The same reference numerals are used in FIG. 2B. FIG. 2B shows that inner liner 18 can be also provided such that it can assume the shape of the side of the insulating body, i.e. fiber molded part 12, facing the exhaust gas component. Inner liner 18 in FIG. 2B bears against the side with insulation surface 12.2. A preferably metal inner liner 18, as shown, for example, in FIGS. 2A and 2B, can be used to provide a simple manner of removing and remounting the fiber molded part. In addition, a preferably metal inner liner has a protective function for the insulating body, i.e. the fiber molded part.

Figure 3:
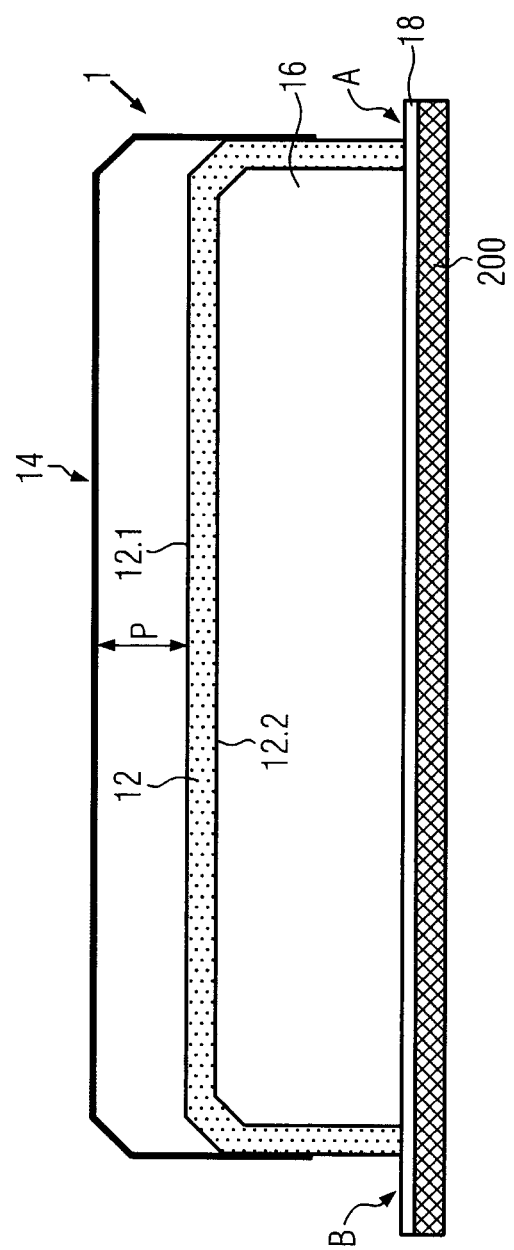
FIG. 3 is a schematic view of a development of an insulation system of FIGS. 1-2B with exchangeable cladding.

FIG. 3 shows a further development of FIG. 2A. The same elements are there designated by same reference numerals. Purely by way of example, FIG. 3 is based on the embodiment shown in FIG. 2A. It is understood, however, that the embodiment shown in FIG. 3 and described below can be based on any of the embodiments described in the context of FIG. 2A and FIG. 2B. Cladding 14 can in FIG. 3 comprise a metal cladding. It is likewise possible to provide a cladding made of duroplastic-thermoplastic plastic and/or elastomeric plastic. Cladding 14 is in FIG. 3 shown to be removable. Though the entire cladding 14 is shown in a simple manner as being removable, it is understood that a multi-part cladding could also provided of which only parts are removable or to be opened and closed, such as with a flap mechanism (presently not shown). Cladding 14 can in FIG. 3 be slid open, for example, in the direction of the double arrow P onto fiber molded part 12 and drawn off from the latter, respectively. Cladding 14 is thereby in this development exchangeable. In the embodiment with a fitting metal cladding, the cladding can be provided such that the outer shell 14 can either completely or in part be closed or opened, whereby an outer shell 14 is provides with the option of a variable opening or closure of the outer shell, i.e. of the cladding. The insulation system is thereby provided with the option to quickly reach the operating temperature corresponding to the exhaust system when shell 14 is closed, and with the open variant cause cooling of component 200 by convection, i.e. to selective switch convection on or off.

Figure 4:
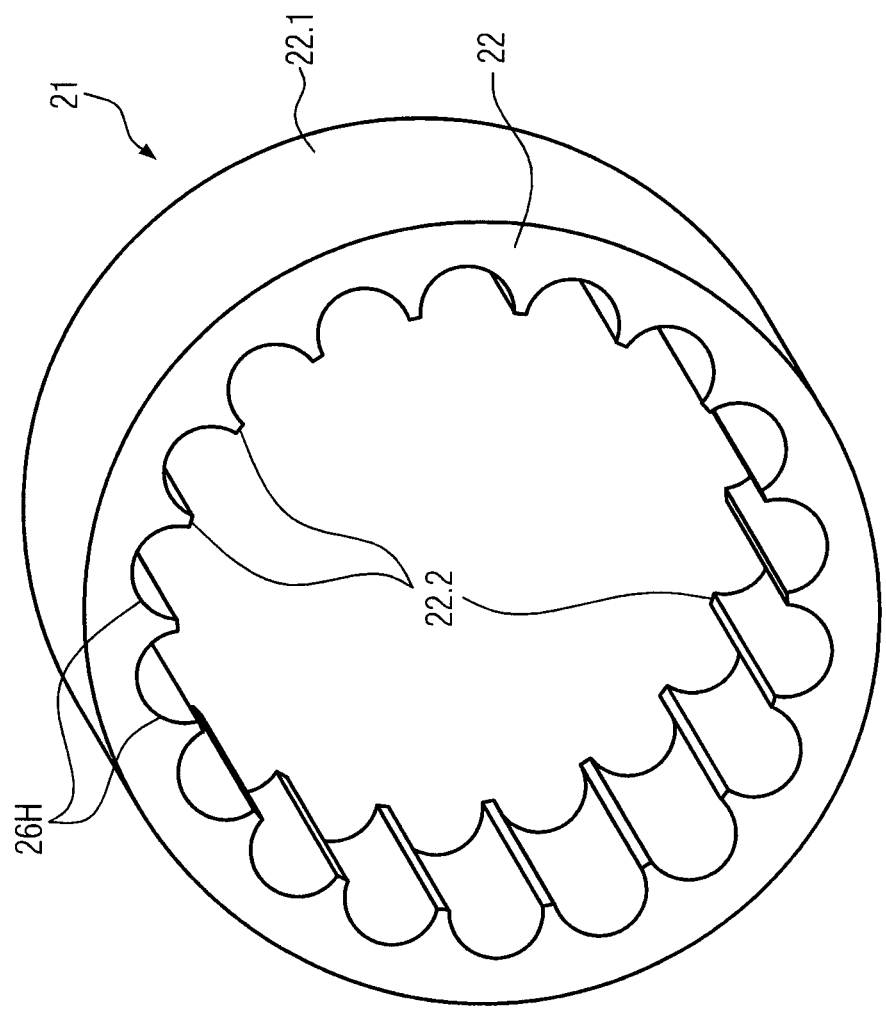
FIG. 4 is a schematic view of an embodiment of an insulation system without a component to be insulated.

FIG. 4 shows a schematic view of another embodiment or development of an insulation system 21 according to one or more of FIGS. 1-3. A component to be insulated is not shown in FIG. 4, but only the insulation system 21. Insulation system 21 in FIG. 4 again, as already shown in FIGS. 1-3, comprises a fiber molded part 22 with an outwardly facing surface 22.1. The cylindrical shape of fiber molded part 22 suggests that surface 22.1 represents a side facing away from a component to be insulated. Fiber molded part 22 comprises indentations 26H on the inner side of the cylinder. Although eighteen indentations are in FIG. 4 drawn in, it is understood that the number of indentations can be larger or smaller, depending on the present applications. Indentations 26H are in FIG. 4 by way of example formed to be semi-spherical and/or semi-cylindrical in shape. Semispherical indentations have the advantage that they can be realized in a simpler manner in terms of production engineering/tool engineering. However, it is understood that other bodies or partial bodies with suitable geometric shapes can be selected, so that one or more cavities are formed. For example, indentations 26H can also have a kind of honeycomb structure. Indentations 26H are provided in insulation surface 22.2. It is understood that the example shown in FIG. 4 and below in FIG. 5 shows a cylindrical symmetry or a tubular symmetry, but other body shapes can exist that have less symmetry.

Figure 5:
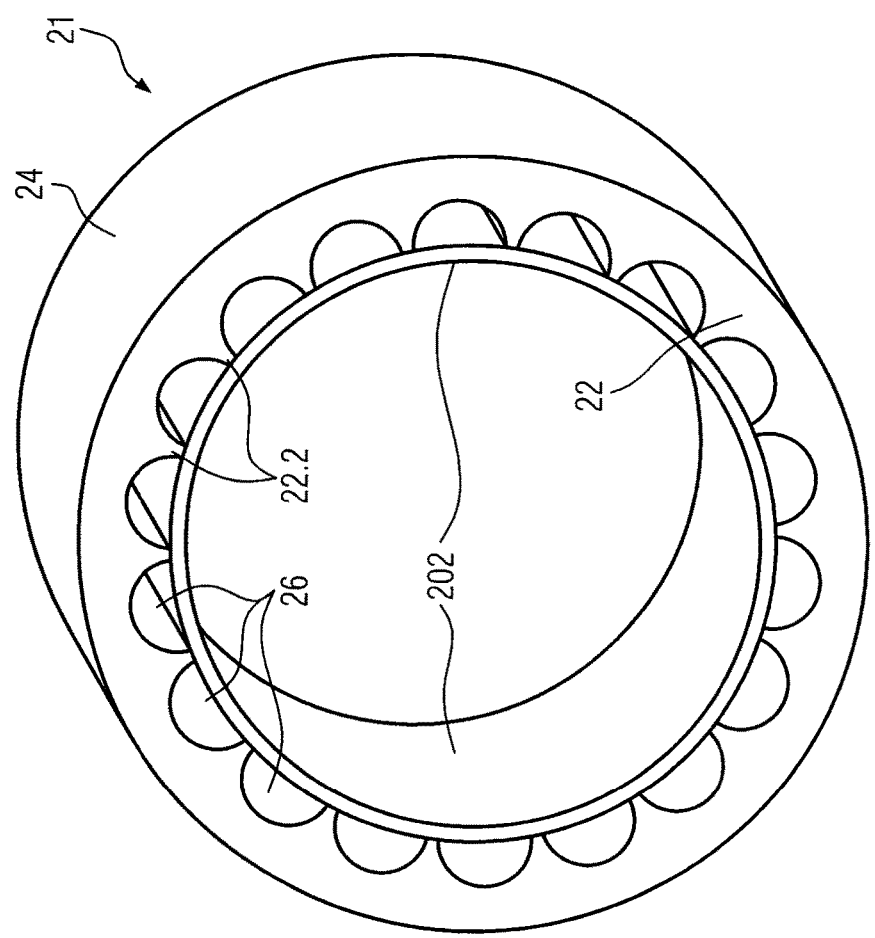
FIG. 5 is a schematic view of an embodiment of an insulation system.

Insulation system 21 of FIG. 4 is in FIG. 5 shown for insulating a component 202 to be insulated, such as an exhaust gas component. Component 202 can correspond to component 200 of FIGS. 1-3. Insulation surface 22.2 in FIG. 4 is composed of many small partial surfaces defining indentations 26H or being located between the respective indentations, respectively. This insulation surface 22.2, i.e. the many small partial surfaces are in contact with component 202, so that as many cavities 26 arise as indentations 26H. The sum of all smaller partial surfaces there again results in a predefined proportion of insulation surface 22.2 of the fiber molded part, where component 202 to be insulated is in contact with insulation surface 22.2. The predefined proportion is again typically at least 10% and a typical value within the meaning of an upper limit can amount to approximately 90% of the insulation surface. Other values are also possible, in particular a value between a minimum of 25% up to a maximum of 55%.

FIG. 5 further shows an outer cladding 24 which encloses surface 22.1 on the side facing away from component 202 to be insulated.

Air chambers 26H introduced into the insulation system achieve the desired insulating effect, so that a larger portion of the energy remains in the exhaust gas and virtually does not dissipate outwards into the surrounding. Virtually no convective heat transfer of the exhaust gas component occurs into the surrounding. In addition to the thermal properties, improved acoustic insulation also arises. For example, sound absorption arises in the range of 6.3 kHz at about 90%.

What is claimed is:

1. An insulation system for thermoacoustic insulation of a component to be insulated, such as an exhaust gas component, comprising:
    a fiber molded part having a surface facing away from the component to be insulated, where the surface facing away is at least in part jacketed with a cladding, and having an insulation surface facing the component to be insulated, where said fiber molded part is applied to the component to be insulated such that a plurality of cavities are formed between a portion of the insulation surface of said fiber molded part and the component to be insulated;
    wherein the cavities are closed, respectively,
    wherein a predefined portion of the insulation surface facing the component to be insulated of said fiber molded part is in contact with the component to be insulated, where the predefined proportion amounts to at least 10% and at most 90%.

2. The insulation system according to claim 1, wherein the insulation surface of said fiber molded part is coated with colored pigments which have a TSR, total solar reflectance, value of at least 65%, where the percentage of the colored pigments relative to a total mass of said fiber molded part amounts to between 1-5%, preferably between 1.5-3%.

3. The insulation system according to claim 1, wherein an inner liner is inserted in between the insulation surface of said fiber molded part and the component to be insulated.

4. The insulation system according to claim 1 wherein, the inner liner comprises a metal inner liner.

5. The insulation system according to claim 1, wherein the cladding comprises a metallic cladding or duroplastic-thermoplastic plastic or elastomeric plastic.

6. The insulation system according to claim 1, wherein the predefined proportion amounts to at least 25% to at most 55%.

7. The insulation system according to claim 1, wherein the insulation surface facing the component to be insulated comprises one or more predefined indentations.

8. The insulation system according to claim 7, where the indentations are semi-spherical and/or semi-cylindrical indentations so that the cavities are formed to be semi-spherical and/or semi-cylindrical in shape.

9. An exhaust gas component having an insulation arranged at least in part on the component, wherein the insulation is configured as an insulation system according to claim 1.

10. A silencer comprising at least one exhaust gas component according to claim 9.

11. A method for thermoacoustic insulation of an exhaust gas component, said method comprising the steps of:
    providing a fiber molded part having a surface facing away from the component to be insulated, where the surface facing away is at least in part jacketed with a cladding and having an insulation surface facing the exhaust gas component; and
    applying the fiber molded part to the exhaust gas component such that a plurality of cavities are formed between a portion of the insulation surface of said fiber molded part and the component to be insulated;
    wherein the cavities are closed, respectively,
    wherein a predefined portion of the insulation surface facing the component to be insulated of said fiber molded part is in contact with the component to be insulated, where the predefined proportion amounts to at least 10% and at most 90%.

12. A method according to claim 11, wherein the insulation surface of the fiber molded part is coated with colored pigments which have a TSR, total solar reflectance, value of at least 65%, where a percentage of the colored pigments relative to a total mass of the fiber molded part amounts to between 1-5%.

13. A method according to claim 12, wherein the percentage of the colored pigments relative to the total mass of the fiber molded part amounts to between 1.5-3%.

14. A method according to claim 11, wherein an inner liner is inserted between the insulation surface of the fiber molded part and the component to be insulated.

15. A method according to claim 14, wherein the inner liner comprises a metal inner liner.

16. A method according to claim 11, wherein the fiber molded part further comprises a surface facing away from the component to be insulated, where the surface facing away is at least in part jacketed with a cladding, wherein the cladding is a metal cladding or comprises duroplastic-thermoplastic plastic or elastomeric plastic.

17. A method according to claim 11, wherein where the predefined proportion amounts to at least 25% to at most 55%.

18. A method according to claim 11, wherein the insulation surface facing the component to be insulated comprises one or more predefined indentations, where the indentations are preferably formed semi-spherical or semi-cylindrical in shape.

19. An insulation system for thermoacoustic insulation of a component comprising:
    a component;
    a fiber molded part having an insulation surface facing said component and a surface facing away from said component, said fiber molded part contacting said component at contact points forming a plurality of closed cavities between said component and the insulation surface; and
    a cladding placed on said fiber molded part over the surface facing away from said component,
    whereby convection in the closed cavity is substantially reduced improving insulation of the component;
    wherein a predefined portion of the insulation surface facing said component to be insulated of said fiber molded part is in contact with said component to be insulated, where the predefined proportion amounts to at least 10% and at most 90%.

20. The insulation system as in claim 19 wherein:
the contact points in contact with said component have a total surface area of a proportion of the insulation surface of at least 10% and at most 90%.

21. The insulation system as in claim 19 wherein:
said cladding is movable towards and away from the surface facing away from said component.

* * * * *